United States Patent
Campbell et al.

(10) Patent No.: US 12,402,755 B2
(45) Date of Patent: Sep. 2, 2025

(54) INJECTION-MOLDABLE AERATOR MIXING ROD AND METHOD OF MANUFACTURING THEREOF

(71) Applicant: Rich Products Corporation, Buffalo, NY (US)

(72) Inventors: Shawn Campbell, Burlington (CA); Ralf Reiser, Orchard Park, NY (US); Rakshitha Doddanaari Shamakumar, Newark, DE (US); Alexander Kaiser, Lancaster, NY (US)

(73) Assignee: Rich Products Corporation, Buffalo, NY (US)

( * ) Notice: Subject to any disclaimer, the term of this patent is extended or adjusted under 35 U.S.C. 154(b) by 975 days.

(21) Appl. No.: 17/240,773

(22) Filed: Apr. 26, 2021

(65) Prior Publication Data
US 2021/0353105 A1    Nov. 18, 2021

Related U.S. Application Data

(60) Provisional application No. 63/025,283, filed on May 15, 2020.

(51) Int. Cl.
*A47J 43/12*    (2006.01)
*B01F 23/232*    (2022.01)
(Continued)

(52) U.S. Cl.
CPC ......... *A47J 43/122* (2013.01); *B01F 23/2323* (2022.01); *B01F 23/235* (2022.01);
(Continued)

(58) Field of Classification Search
CPC ... A47J 43/122; B01F 23/2323; B01F 23/235; B01F 23/237611; B01F 25/3111;
(Continued)

(56) References Cited

U.S. PATENT DOCUMENTS 1,922,749 A    8/1933  Roush
1,991,439 A *  2/1935  Wood ............... A22C 9/004
                                              452/142
(Continued)

FOREIGN PATENT DOCUMENTS

CN    207058958 U    3/2018
DE    19718351 A1    11/1998
(Continued)

OTHER PUBLICATIONS

European Patent Office Action for Application No. 21805174.6 dated Apr. 22, 2024 (9 pages).
(Continued)

*Primary Examiner* — Charles Cooley
(74) *Attorney, Agent, or Firm* — Michael Best & Friedrich LLP

(57) ABSTRACT

An aerator mixing rod includes a body having a first and second opposite ends and an outer surface extending between the ends. The body defines a longitudinal axis extending through the ends. The aerator mixing rod also includes teeth extending radially outward from the outer surface, with a first row of teeth and a second row of teeth spaced from the first row along the longitudinal axis. A first passageway is formed between adjacent teeth of the first row, and a second passageway is formed between adjacent teeth of the second row. The first passageway is at least partially misaligned with the second passageway in a direction parallel to the longitudinal axis such that the first passageway and the second passageway form a tortuous path for fluid flowing along the outer surface of the body. The aerator mixing rod is formed from an injection-moldable material by an injection molding process.

15 Claims, 14 Drawing Sheets

(51) Int. Cl.
*B01F 23/235* (2022.01)
*B01F 23/237* (2022.01)
*B29C 45/00* (2006.01)
*B29C 45/26* (2006.01)
*B29K 59/00* (2006.01)
*B29L 31/00* (2006.01)

(52) U.S. Cl.
CPC ...... *B01F 23/2351* (2022.01); *B29C 45/0001* (2013.01); *B29C 45/0025* (2013.01); *B29C 45/2624* (2013.01); *B01F 23/237611* (2022.01); *B29C 2045/0034* (2013.01); *B29K 2059/00* (2013.01); *B29L 2031/775* (2013.01)

(58) Field of Classification Search
CPC ............. B01F 2101/07; B01F 23/2351; B29C 45/0001; B29C 45/0025; B29C 45/2624; B29C 2045/0034; B29C 45/2612; B29C 45/2614; B29C 45/261; B29C 45/2673; B29C 45/37; B29C 45/40; B29K 2059/00; B29K 2995/0012; B29L 2031/775; C02F 7/00; A23P 30/40
USPC ....................................... 366/81, 82
See application file for complete search history.

(56) References Cited

U.S. PATENT DOCUMENTS

| | | | |
|---|---|---|---|
| 3,009,606 A | 11/1961 | Zimmermann | |
| 3,047,907 A * | 8/1962 | Rettig | B29C 48/465 |
| | | | 425/207 |
| 3,169,752 A * | 2/1965 | Laubarede | B29B 7/422 |
| | | | 366/80 |
| 3,203,371 A | 8/1965 | Mosey | |
| 3,219,320 A | 11/1965 | Sutter | |
| 3,559,958 A | 2/1971 | Carpigiani | |
| 3,632,021 A | 1/1972 | MacManus | |
| 3,758,080 A | 9/1973 | MacManus | |
| 3,989,434 A | 11/1976 | Mercer | |
| 4,015,833 A * | 4/1977 | Kim | B29C 48/565 |
| | | | 366/82 |
| 4,085,482 A * | 4/1978 | Charron | A22C 9/004 |
| | | | 452/144 |
| 4,144,293 A | 3/1979 | Hamoto et al. | |
| 4,168,727 A | 9/1979 | Yoshida | |
| 4,312,596 A | 1/1982 | Maezawa et al. | |
| 4,457,876 A | 7/1984 | Brand | |
| 4,816,190 A | 3/1989 | Kirchler | |
| 4,940,329 A * | 7/1990 | Dienst | B29B 7/483 |
| | | | 366/85 |
| 5,000,082 A | 3/1991 | Lassota | |
| 5,032,073 A * | 7/1991 | Moyer, III | B29C 48/565 |
| | | | 264/211.21 |
| 5,052,593 A | 10/1991 | Grome et al. | |
| 5,089,178 A * | 2/1992 | Passoni | B01F 25/434 |
| | | | 261/DIG. 16 |
| 5,145,453 A * | 9/1992 | Anderson | A22C 9/004 |
| | | | 452/142 |
| D331,365 S | 12/1992 | Davis | |
| 5,318,358 A * | 6/1994 | Wobbe | B29B 7/489 |
| | | | 366/85 |
| 5,340,354 A * | 8/1994 | Anderson | A22C 9/004 |
| | | | 452/142 |
| D371,941 S | 7/1996 | Kind et al. | |
| 5,567,370 A * | 10/1996 | Deseke | B29C 48/575 |
| | | | 366/82 |
| 5,804,896 A | 9/1998 | Tkehara et al. | |
| 5,907,993 A | 6/1999 | Van Camp et al. | |
| 6,283,625 B2 | 9/2001 | Frankel et al. | |
| 6,550,959 B2 * | 4/2003 | Huber | B01F 27/7221 |
| | | | 366/322 |
| 6,769,801 B1 | 8/2004 | Maurer et al. | |
| D535,851 S | 1/2007 | Vavasseure | |
| 7,422,362 B2 | 9/2008 | Sands | |
| 7,669,517 B2 | 3/2010 | Boussemart et al. | |
| D627,639 S | 11/2010 | Ziegler et al. | |
| 8,172,453 B2 | 5/2012 | Boussemart et al. | |
| 8,308,342 B2 * | 11/2012 | Cabrales | B01F 27/2123 |
| | | | 366/82 |
| D682,607 S | 5/2013 | Garman et al. | |
| 8,469,235 B2 | 6/2013 | Lion | |
| D701,725 S | 4/2014 | Wang | |
| 8,794,485 B2 | 8/2014 | Lunn et al. | |
| 9,332,881 B2 | 5/2016 | Sands | |
| 9,675,943 B2 | 6/2017 | Jialanella et al. | |
| 9,981,232 B2 | 5/2018 | Pappalardo | |
| D823,802 S | 7/2018 | Battistella | |
| D825,616 S | 8/2018 | Monden | |
| 10,220,361 B1 * | 3/2019 | Dushine | B01F 21/10 |
| D909,419 S | 2/2021 | Nemoto et al. | |
| D923,459 S | 6/2021 | Chan | |
| D937,027 S | 11/2021 | Lee | |
| D940,490 S | 1/2022 | Grob | |
| D941,883 S | 1/2022 | Cooper et al. | |
| D946,522 S | 3/2022 | Norris et al. | |
| D946,523 S | 3/2022 | Simon et al. | |
| 2002/0075754 A1 * | 6/2002 | Huber | B01F 35/75455 |
| | | | 366/147 |
| 2003/0129293 A1 | 7/2003 | Charles, Jr. | |
| 2004/0136261 A1 * | 7/2004 | Huber | B01F 35/213 |
| | | | 366/186 |
| 2005/0082312 A1 | 4/2005 | Gruenewald et al. | |
| 2005/0270894 A1 * | 12/2005 | Gates | B29B 7/483 |
| | | | 366/82 |
| 2006/0000852 A1 | 1/2006 | Manne | |
| 2010/0193544 A1 | 8/2010 | Rusch et al. | |
| 2010/0221392 A1 | 9/2010 | Nakai et al. | |
| 2013/0003494 A1 | 1/2013 | Kirk | |
| 2014/0000302 A1 | 1/2014 | Cocchi et al. | |
| 2014/0322412 A1 | 10/2014 | Buchholz et al. | |
| 2017/0303734 A1 | 10/2017 | Balkau | |
| 2018/0220837 A1 * | 8/2018 | Midden | A47J 43/121 |
| 2018/0295854 A1 | 10/2018 | Clavier et al. | |
| 2019/0226135 A1 | 7/2019 | Chan | |
| 2020/0109782 A1 | 4/2020 | Odaka | |
| 2021/0274962 A1 | 9/2021 | Nabeiro et al. | |
| 2021/0274965 A1 | 9/2021 | Reiser | |
| 2021/0353105 A1 * | 11/2021 | Campbell | B01F 23/2323 |
| 2022/0322867 A1 | 10/2022 | Hansen et al. | |

FOREIGN PATENT DOCUMENTS

| | | |
|---|---|---|
| EP | 0208927 A1 | 6/1986 |
| EP | 0464341 A1 | 8/1992 |
| EP | 1221883 B1 | 11/2005 |
| EP | 1827188 B1 | 1/2009 |
| EP | 2000067 B1 | 6/2010 |
| EP | 1972241 B1 | 10/2010 |
| EP | 2252186 B1 | 11/2011 |
| EP | 3189887 B1 | 7/2017 |
| JP | 2002176920 A | 6/2002 |
| KR | 3004666170000 | 10/2007 |
| KR | 101254052 B1 | 6/2010 |
| KR | 101269913 B1 | 5/2013 |
| KR | 3009325130000 | 11/2017 |
| TW | D118606 | 8/2007 |
| WO | WO2008047106 A1 | 4/2008 |
| WO | WO2013128708 A1 | 9/2013 |
| WO | WO2017097860 A1 | 6/2017 |
| WO | WO2019090379 A1 | 5/2019 |
| WO | 2021178554 A1 | 9/2021 |

OTHER PUBLICATIONS

Canadian Patent Office Action for Application No. 3116676 dated Feb. 22, 2024 (4 pages).
International Search Report with Written Opinion for related Application No. PCT/US2021/029215 dated Jul. 21, 2021 (14 Pages).
Mussana, "Cream Whipping Machines", Parts Brochure available at least as early as May 14, 2020 (9 Pages).

(56) References Cited

OTHER PUBLICATIONS

Stuart, "ISI Thermo Xpress Whip (1L)" website: https://www.ajstuarts.com/shop/view/3192/isi-thermo-xpress-whip-1-litre, webpage available at least as early as Feb. 28, 2020 (4 Pages).

International Search Report with Written Opinion for related Application No. PCT/US2021/020693 dated Jul. 1, 2021 (12 Pages).

* cited by examiner

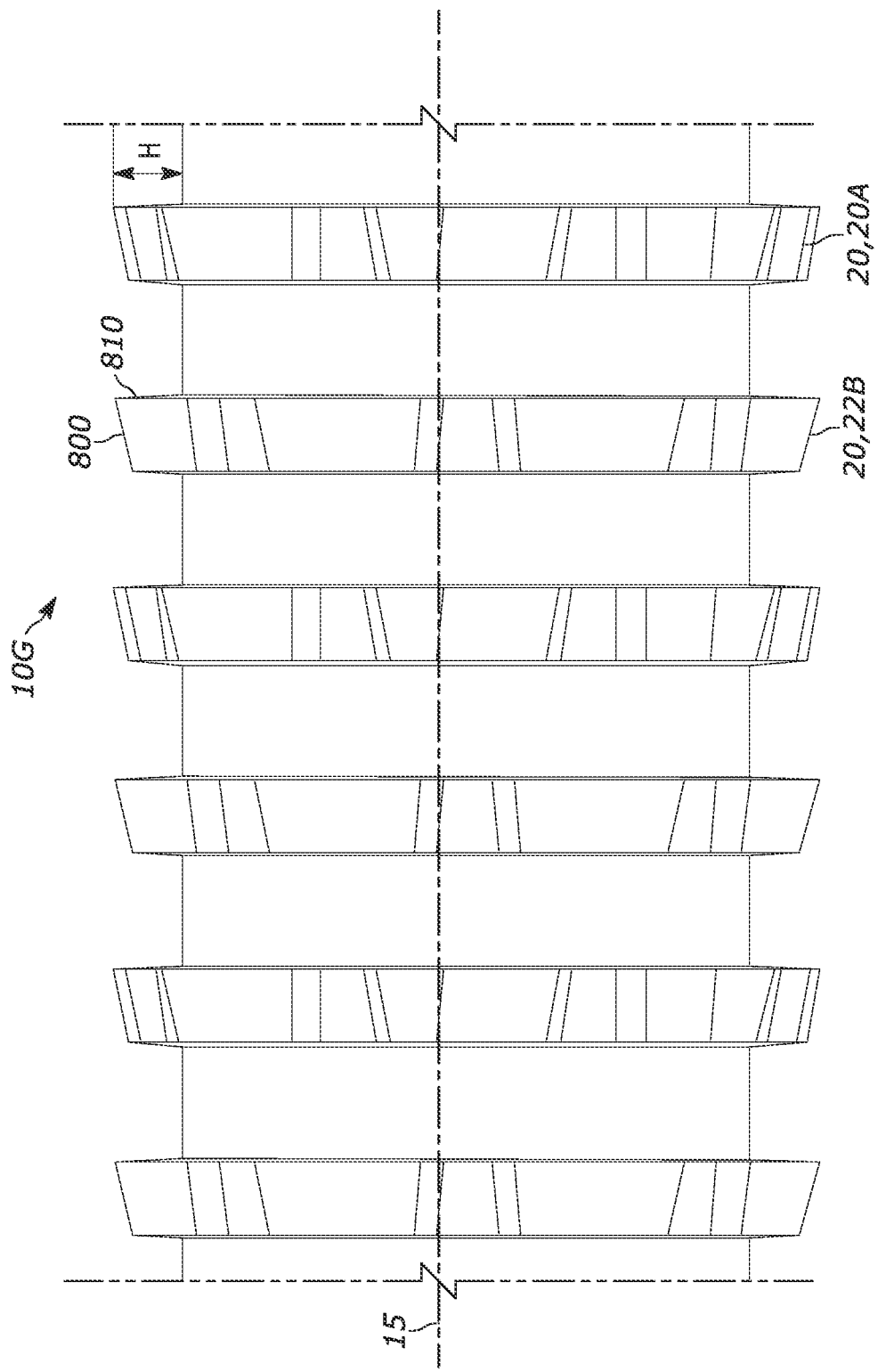

INJECTION-MOLDABLE AERATOR MIXING ROD AND METHOD OF MANUFACTURING THEREOF

CROSS-REFERENCE TO RELATED APPLICATIONS

This application claims priority to U.S. Provisional Patent Application No. 63/025,283, filed May 15, 2020, the entire content of which is incorporated herein by reference.

FIELD OF THE DISCLOSURE

The present disclosure relates to an aerator mixing rod, and more particularly to an injection-molded aerator mixing rod.

BACKGROUND OF THE DISCLOSURE

An aerator mixing rod is a static mixing rod that mixes and aerates a liquid product as the product flows over or through the mixing rod. Such aerator mixing rods may be incorporated into food product dispensers, such as whipped product (e.g., whipped cream or other aerated emulsions) dispensers. Typical whipped product dispensers may include a product reservoir containing a liquid product to be whipped, a whipping assembly (including the aerator mixing rod), and a drive mechanism configured to move product from the product reservoir through the whipping assembly to form a whipped product. The whipped product is then dispensed through a nozzle for use.

To emulsify the liquid product and form whipped cream from the whipping assembly, the drive mechanism forces the liquid product through passageways formed between teeth on an outer surface of the aerator mixing rod. When the liquid product moves through the passageways on the aerator mixing rod, air/pressurized gas mixes with the liquid product to form a foam-like airy substance.

Due to their complex geometries, known aerator mixing rods are manufactured using either CNC machining, an Electric Discharge Machine (EDM), or investment casting. However, these conventional methods are proven to be costly and time intensive when producing aerator mixing rods on an industrial scale. Additionally, these methods may yield aerator mixing rods with dimensional inconsistencies or overall unsatisfactory surface finishes, resulting in waste and increasing overall costs.

SUMMARY OF THE DISCLOSURE

The present disclosure provides, in a first aspect, an aerator mixing rod including a body having a first end, a second end opposite the first end, and an outer surface extending between the first and second ends. The body defines a longitudinal axis extending through the first and second ends. The aerator mixing rod also includes a plurality of teeth extending radially outward from the outer surface of the body, with a first row of teeth and a second row of teeth spaced from the first row of teeth along the longitudinal axis. A first passageway is formed between adjacent teeth of the first row of teeth, and a second passageway is formed between adjacent teeth of the second row of teeth. The first passageway is at least partially misaligned with the second passageway in a direction parallel to the longitudinal axis such that the first passageway and the second passageway are configured to at least partially form a tortuous path for fluid flowing along the outer surface of the body. The aerator mixing rod is formed from an injection-moldable material by an injection molding process.

In some aspects, each tooth of the plurality of teeth includes a first side and a second side generally opposite the first side, and the first and second sides converge in a radial outward direction of the aerator mixing rod.

In some aspects, the first and second sides are axially-facing sides.

In some aspects, the first and second sides are circumferentially facing sides.

In some aspects, each tooth of the plurality of teeth includes an inner width and an outer width. The inner width is defined adjacent the outer surface of the body, and the inner width is greater than the outer width.

In some aspects, the inner width is at least 5% greater than the outer width.

In some aspects, each tooth of the plurality of teeth includes an outermost point. The outermost points of the plurality of teeth collectively define a first diameter, the body defines a second diameter, and the second diameter is between 10% and 95% of the first diameter.

In some aspects, the injection-moldable material is a plastic material.

In some aspects, the plastic material includes an acetal homopolymer.

In some aspects, the first row of teeth and the second row of teeth each include 8 teeth.

In some aspects, the aerator mixing rod includes a core and an outer shell, the outer shell is molded over the core, and the outer shell includes the plurality of teeth.

The present disclosure provides, in a second aspect, a food product dispenser including a drive unit and a dispensing unit coupled to the drive unit. The dispensing unit includes a product reservoir configured to store a food product, a dispensing nozzle, and a product transfer assembly including an aerator mixing rod. The product transfer assembly is configured to be driven by the drive unit to convey the food product from the product reservoir, along the aerator mixing rod, and to the dispensing nozzle, and the aerator mixing rod is formed from an injection-moldable material by an injection molding process.

In some aspects, the aerator mixing rod includes a thermal conductivity between 0.1 and 0.5 Watts/Meter-Kelvin.

In some aspects, the aerator mixing rod includes a first portion and a second portion arranged side-by-side within the product transfer assembly.

In some aspects, the aerator mixing rod includes a first portion and a second portion arranged concentrically within the product transfer assembly.

In some aspects, the injection-moldable material is a plastic material.

In some aspects, the injection-moldable material includes an acetal homopolymer.

In a third aspect, the present disclosure provides a method of manufacturing an aerator mixing rod using injection molding. The method includes arranging a plurality of mold parts into a mold assembly structure, the mold assembly structure defining a mold cavity shaped to form the aerator mixing rod such that the aerator mixing rod includes a body having a first end, a second end opposite the first end, and an outer surface extending between the first and second ends. The body defines a longitudinal axis extending through the first and second ends. A plurality of teeth extends radially outward from the outer surface of the body, the plurality of teeth including a first row of teeth and a second row of teeth spaced from the first row of teeth along the longitudinal axis. A first passageway is formed between adjacent teeth of the first row of teeth, and a second passageway is formed between adjacent teeth of the second row of teeth. The first passageway is at least partially misaligned with the second passageway in a direction parallel to the longitudinal axis such that the first passageway and the second passageway are configured to at least partially form a tortuous path for fluid flowing along the outer surface of the body. The method further includes heating an injection moldable material, injecting the injection moldable material into the mold assembly structure to form the aerator mixing rod, and, after a cooling period, removing the aerator mixing rod from the mold assembly structure by separating the plurality of mold parts from the aerator mixing rod.

In some aspects, arranging the plurality of mold parts into the mold assembly structure includes selecting between a plurality of different mold release configurations in order to prevent an undercut.

In some aspects, at least one of the mold release configurations is a symmetrical configuration including a plurality of part lines intersecting at a center of the mold cavity, and wherein separating the plurality of mold parts includes separating the mold parts along the part lines.

In some aspects, least one of the mold release configurations is an asymmetrical configuration including four part lines, and wherein separating the plurality of mold parts includes separating the mold parts along the part lines.

Other features and aspects of the disclosure will become apparent by consideration of the following detailed description and accompanying drawings. Any feature(s) described herein in relation to one aspect or embodiment may be combined with any other feature(s) described herein in relation to any other aspect or embodiment as appropriate and applicable.

BRIEF DESCRIPTION OF THE DRAWINGS

FIG. 9C is an enlarged side view illustrating a portion of an aerator mixing rod according to another embodiment.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

Figure 1:
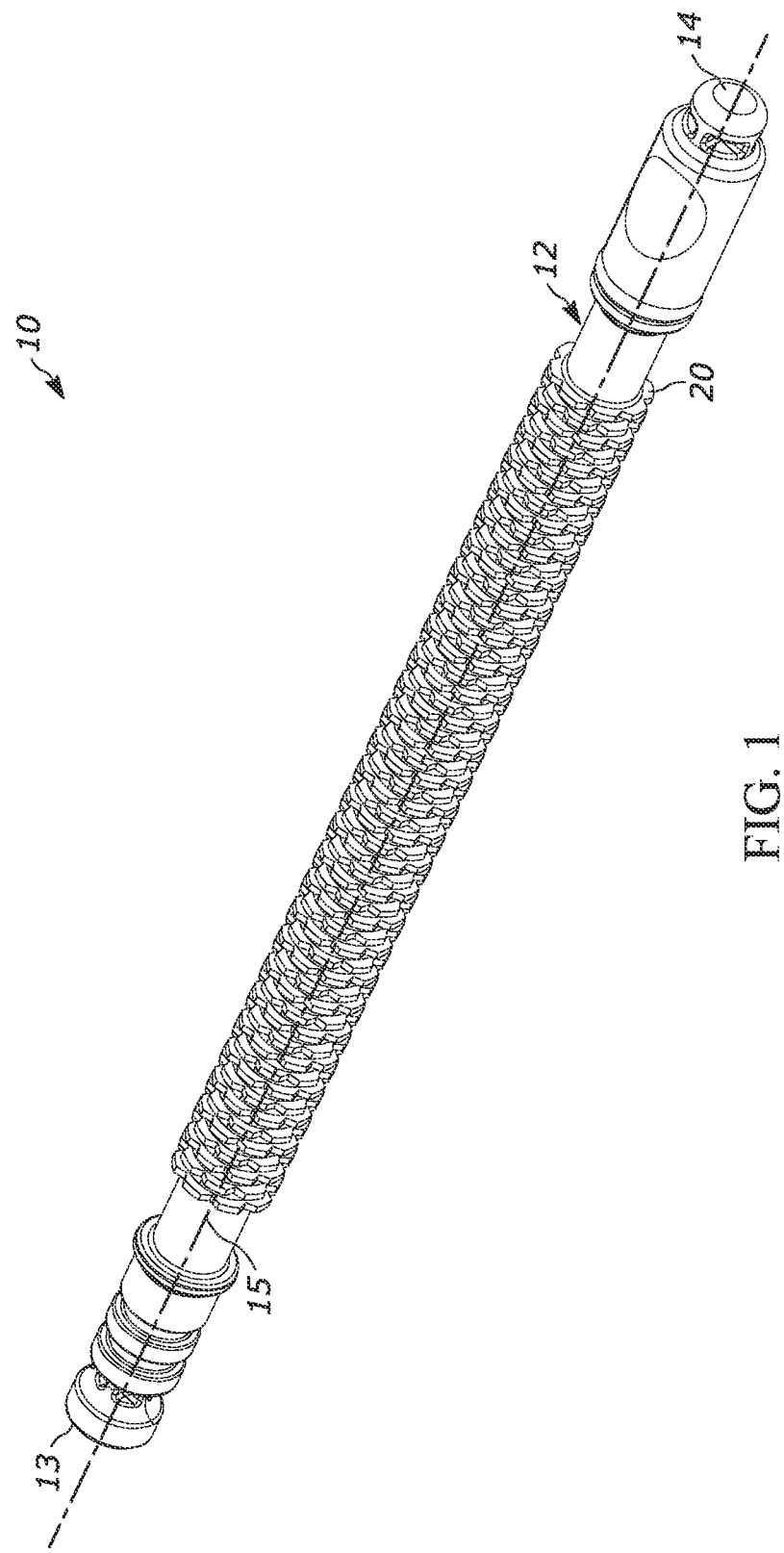
FIG. 1 is a perspective view of an aerator mixing rod according to an embodiment of the disclosure.
Figure 2:
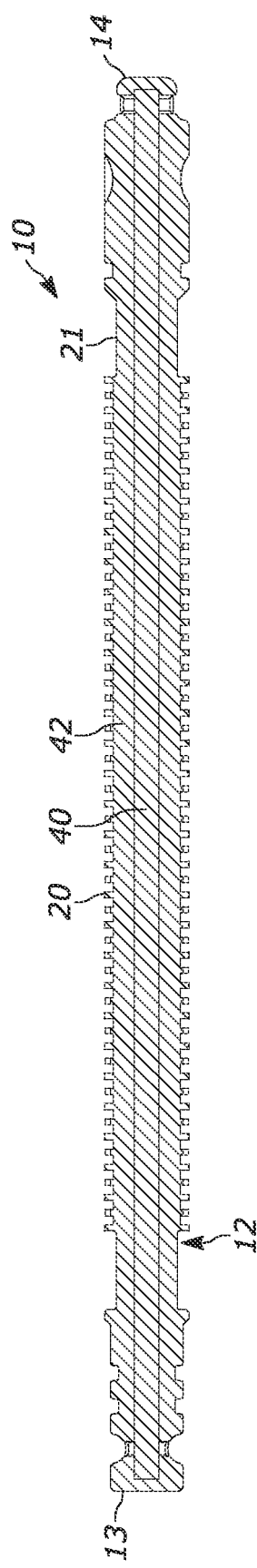
FIG. 2 is a longitudinal cross-sectional view of the aerator mixing rod of FIG. 1.

FIGS. 1-4 illustrate an aerator mixing rod 10 according to one embodiment. The aerator mixing rod 10, (which may also be referred to as an "aerator rod," "mixing rod," or "static mixing rod"), includes an elongated body 12 having a first end 13 and a second end 14 opposite the first end 13 (FIG. 1). The body 12 defines a longitudinal axis 15, which extends centrally through the first and second ends 13, 14. The body 12 has a generally cylindrical shape in the illustrated embodiment; however, the body 12 may be shaped differently in other embodiments.

Figure 3A:
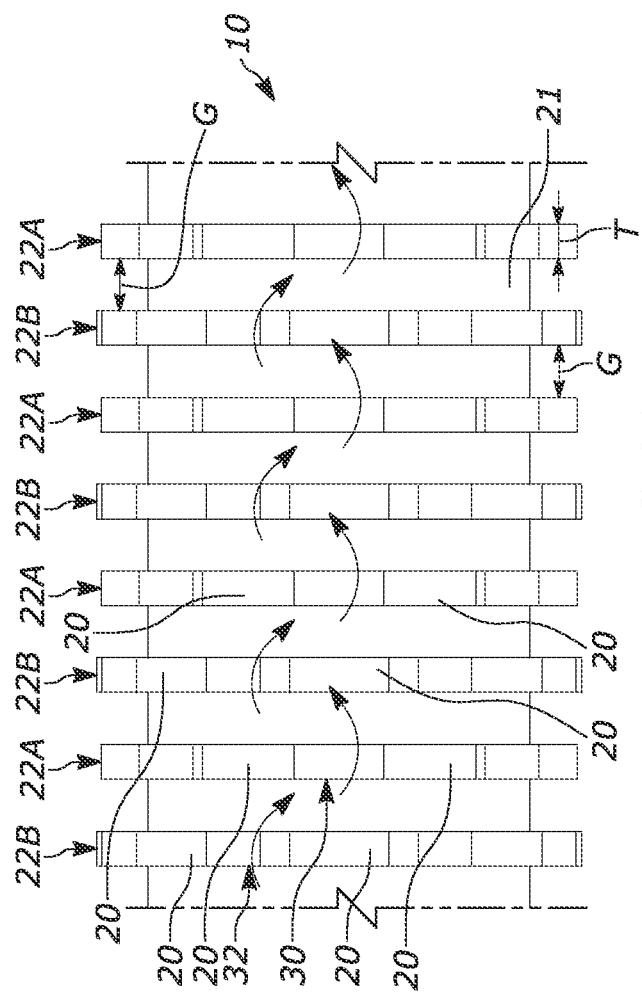
FIG. 3A is an enlarged side view illustrating a portion of the aerator mixing rod of FIG. 1.
Figure 3B:
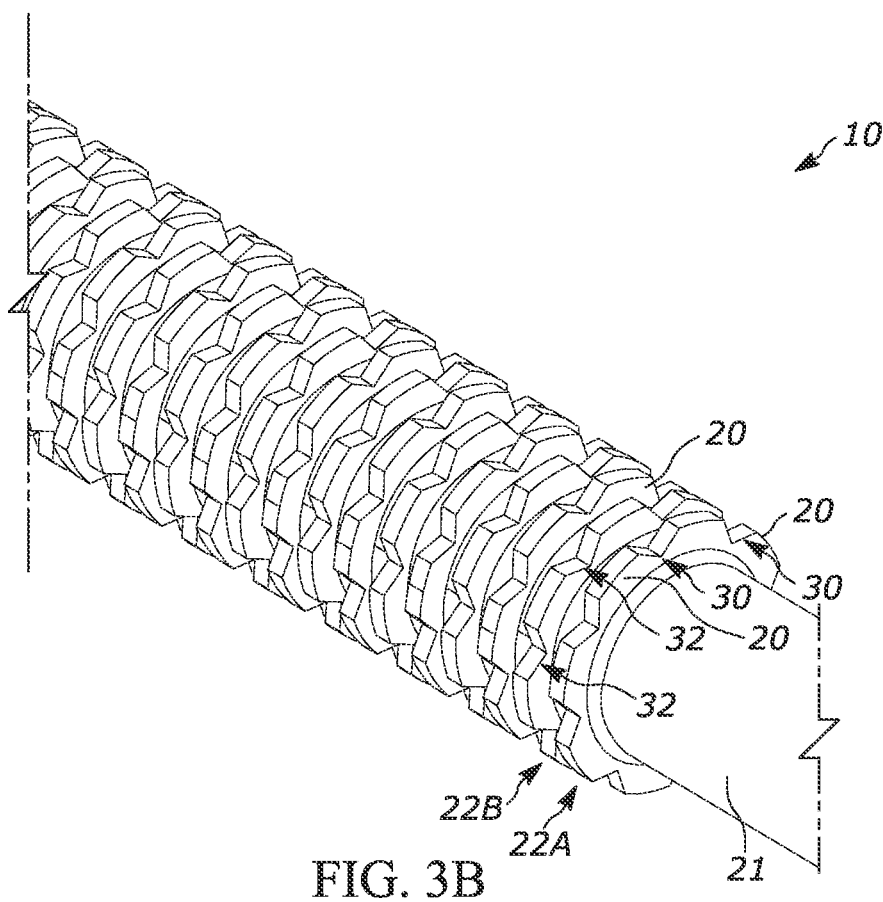
FIG. 3B is an enlarged perspective view illustrating a portion of the aerator mixing rod of FIG. 1.

With reference to FIGS. 3A-3B, the illustrated aerator mixing rod 10 includes a plurality of teeth 20 projecting radially from an outer surface 21 of the mixing rod 10. In the illustrated embodiment, the teeth 20 are arranged in a plurality of first rows 22A and a plurality of second rows 22B. The first rows 22A and second rows 22B alternate along the longitudinal axis 15 of the aerator mixing rod 10.

Each first row 22A of teeth 20 defines a first plurality of passageways 30 between adjacent teeth 20 of the first row 22A, and each second row 22B of teeth 20 defines a second plurality of passageways 32 between adjacent teeth 20 of the second row 22B. Each first row 22A of teeth 20 and second row 22B of teeth 20 are axially spaced by an interstitial distance G (FIG. 3A) such that an axial gap is defined between the rows 22A, 22B of teeth 20.

With continued reference to FIGS. 3A-3B, the first passageways 30 are at least partially axially misaligned with the second passageways 32, (that is, the first passageways 30 are offset from the second passageways 32 in a circumferential direction of the aerator mixing rod 10), to define a serpentine or tortuous flow path (see e.g., FIG. 3B) through the passageways 30, 32 along the exterior of the aerator mixing rod 10. In other words, there is no direct axial flow path that would allow a liquid product to flow directly through the first passageways 30 and the second passageways 32 without impinging upon the teeth 20.

Figure 4:
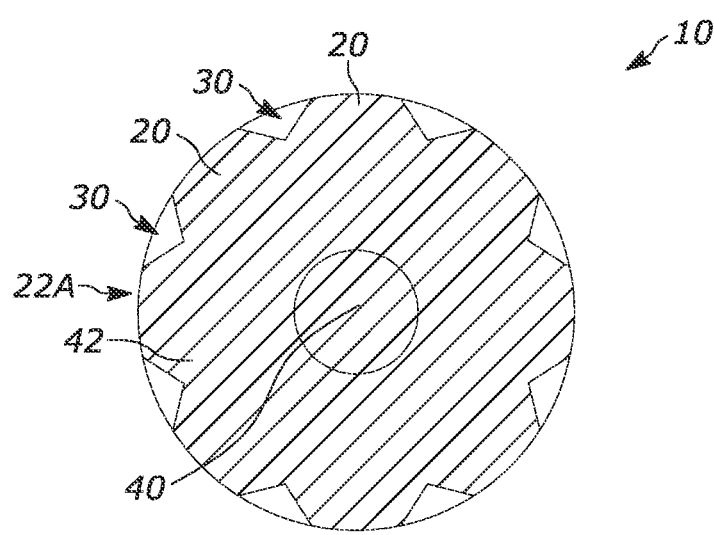
FIG. 4 is a transverse cross-sectional view of the aerator mixing rod of FIG. 1.

Referring to FIGS. 3A and 3B, the first and second rows 22A, 22B of teeth 20 can be configured to have four, six, or eight teeth in each respective row 22A, 22B. For example, each first row 22A of teeth 20 may have four teeth 20, and each second row 22B of teeth 20 may have eight teeth 20. In the illustrated embodiment, the first and second rows 22A, 22B each have the same number of teeth 20. For example, the first and second rows 22A, 22B may each include eight teeth (FIG. 4).

In some embodiments, the aerator mixing rod 10 may include twenty or more rows of teeth 20 (e.g., ten first rows 22A and ten second rows 22B). In other embodiments, the aerator mixing rod 10 may include thirty or more rows of teeth 20 (e.g., fifteen first rows 22A and fifteen second rows 22B). In other embodiments, the aerator mixing rod 10 may include forty or more rows of teeth (e.g., twenty first rows 22A and twenty second rows 22B). In yet other embodiments, the aerator mixing rod 10 may include a greater number of unique rows (e.g., three rows, four rows, or more) arranged in various repeating patterns to provide a tortuous flow path with desired characteristics to suit a particular product or application.

In operation, the aerator mixing rod 10 is positioned within a fluid flow passage, such as a tube. A liquid product is moved through the fluid flow passage (e.g., by a pump, pressurized gas source, or any other means). When the liquid product encounters the aerator mixing rod 10, the liquid product is forced through the passageways 30, 32 between the teeth 20. As the liquid product travels the length of the aerator mixing rod 10, the liquid product is sheared by the teeth 20, effectively mixing and, in some embodiments, aerating and whipping the liquid product and producing a foam-like airy substance. The serpentine flow pattern (FIG. 3B) facilitates the creation of a proper whipped product yielding an overall desirable appearance and consistency.

For food product whipping applications, the aerator mixing rod 10 is formed in a mold assembly from a food-safe, non-porous, injection moldable material. In the illustrated embodiment, the aerator mixing rod 10 is formed from an injection moldable thermoplastic material, and more particularly an engineering thermoplastic such as Delrin® acetal homopolymer, to provide the aerator mixing rod 10 with sufficient strength and dimensional stability. The aerator mixing rod 10 may alternatively be made from other injection moldable materials, including but not limited to aluminum or stainless steel (e.g., via metal injection molding), ceramics, other plastics (e.g. PBT, PET, PTT, PLA, PP, ABS, ASA, PEI), cellulose-based materials or other biomaterials, silicone-based compounds, or foamed materials (e.g., polyurethane, expanded polystyrene).

In some embodiments, the aerator mixing rod 10 may be formed from a combination of materials via multiple molding and/or coating operations. For example, with reference to FIGS. 2 and 4, the illustrated aerator mixing rod 10 includes a core 40 and an outer shell 42 surrounding the core 40. The core 40 may be formed via a first molding operation, and the outer shell 42 may subsequently be molded around the core 40 in a second molding operation. In the illustrated embodiment, the teeth 20 are formed as part of the outer shell 42.

Forming the aerator mixing rod 10 using a multi-step molding process provides advantages, including a reduced mold volume per molding process, which in turn improves dimensional stability by reducing contraction that occurs during solidification and cooling. A multi-step molding process also allows the aerator mixing rod 10 to optionally be formed from multiple different materials. For example, in some embodiments, the core 40 may be formed from a foamed material, and the outer shell 42 may be formed from a thermoplastic material. Such embodiments may allow the aerator mixing rod 10 to be lighter weight and have other properties that may be desirable in certain applications, such as low thermal conductivity.

Figure 5A:
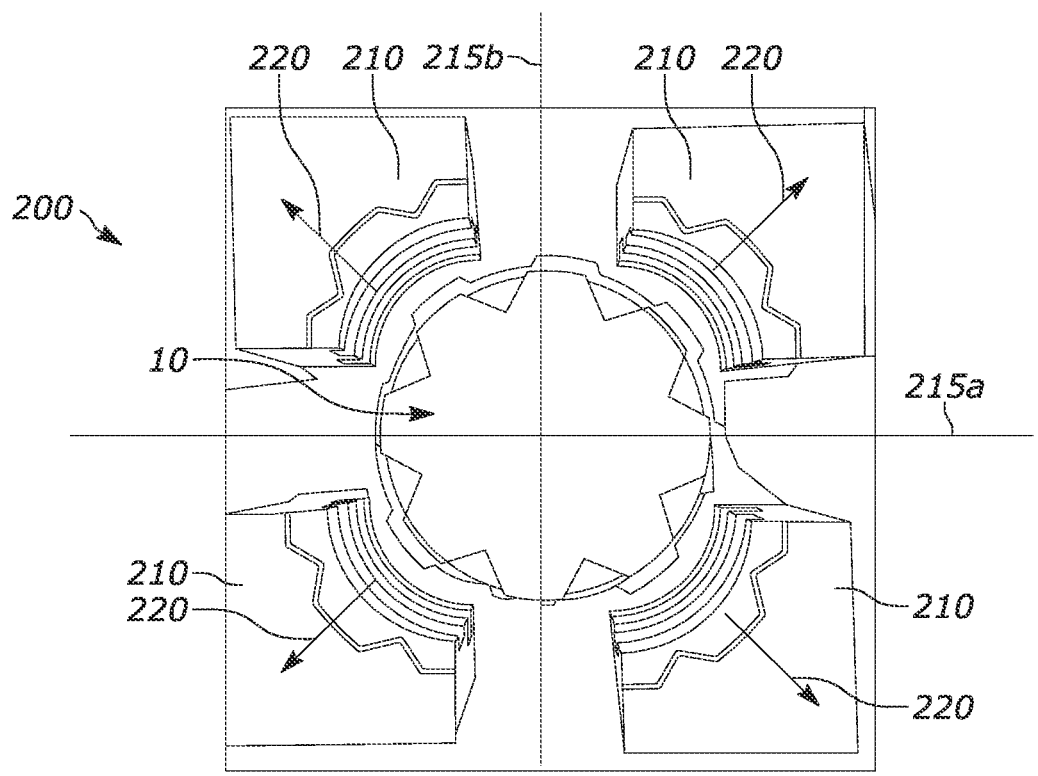
FIG. 5A illustrates a molding assembly having a symmetrical release configuration, which may be used in molding an aerator mixing rod such as the aerator mixing rod of FIG. 1.
Figure 5B:
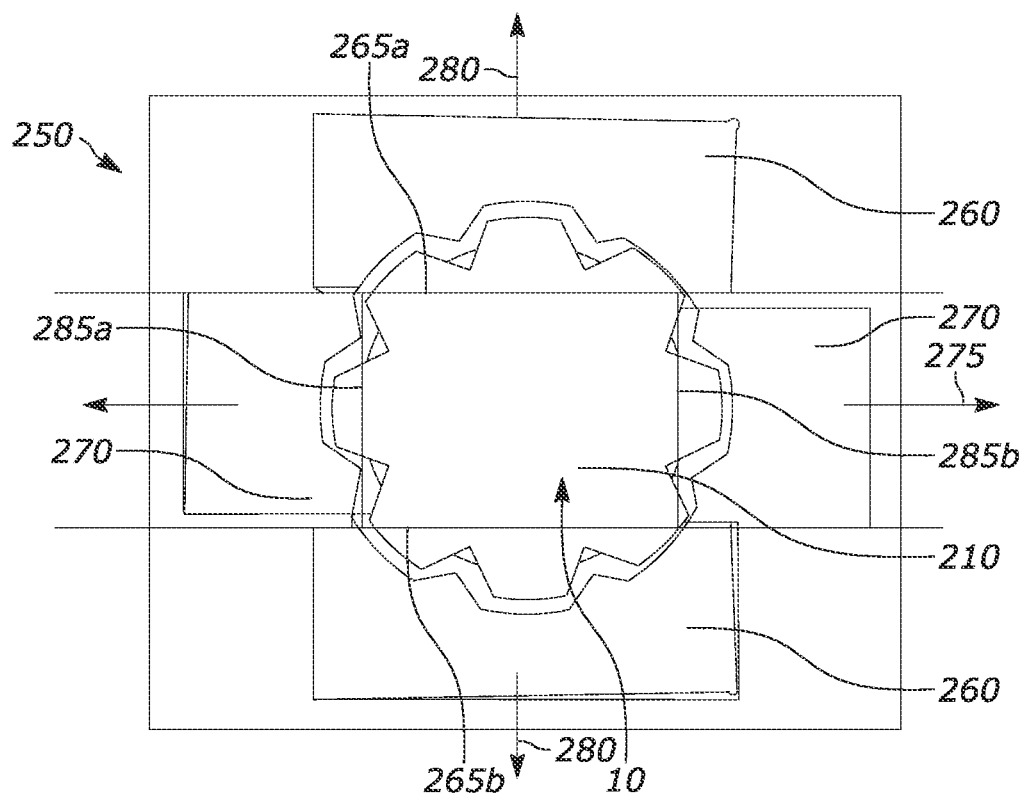
FIG. 5B illustrates a molding assembly having an asymmetrical mold release configuration, which may be used in molding an aerator mixing rod such as the aerator mixing rod of FIG. 1.

FIGS. 5A-5B illustrate exemplary mold assemblies 200, 250 that may be used to form the aerator mixing rod 10. Each of the illustrated mold assemblies 200, 250 includes a plurality of movable mold parts with different release configurations. For example, the illustrated mold assembly 200 has a symmetrical release configuration with four segmented mold parts 210 configured to abut one another at respective parting lines 215a, 215b (FIG. 5A). In the illustrated embodiment, the parting lines 215a, 215b are transverse and intersect at a center of the mold cavity formed by the mold parts 210 (corresponding to the center of the aerator mixing rod 10). The symmetrical configuration of the mold assembly 200 allows the mold parts 210 to all be released from their respective parting lines 215 in radial draw directions 220.

Thus, a method of manufacturing the aerator mixing rod 10 using injection molding may include arranging the mold parts 210 into a mold assembly structure 200 that defines a mold cavity shaped to form the aerator mixing rod 10. Next, the method may further include heating an injection moldable material, injecting the injection moldable material into the mold assembly structure 200 to form the aerator mixing rod 10, and, after a cooling period, removing the aerator mixing rod 10 from the mold assembly structure 200 by separating the plurality of mold parts 210 from the aerator mixing rod 10 along the parting lines 215. The mold parts 210 move in the radial draw directions 220 during separation.

With reference to FIG. 5B, the illustrated mold assembly 250 has an asymmetrical release configuration that includes two first mold parts 260 defining respective parting lines 265a, 265b and two second mold parts 270 defining respective parting lines 285a, 285b. With reference to the orientation illustrated in FIG. 5B, the mold assembly 250 allows the first mold parts 260 to be released vertically (in the direction of arrows 280) from the mold parting lines 265a, 265b. Either simultaneously or in sequence, the second mold parts 270 can be released horizontally (in the direction of arrows 275) from the parting lines 285a, 285b.

Thus, a method of manufacturing the aerator mixing rod 10 using injection molding may include arranging the mold parts 260, 270 into a mold assembly structure 250 that defines a mold cavity shaped to form the aerator mixing rod 10. Next, the method may further include heating an injection moldable material, injecting the injection moldable material into the mold assembly structure 250 to form the aerator mixing rod 10, and, after a cooling period, removing the aerator mixing rod 10 from the mold assembly structure 250 by separating the mold parts 260 along the parting lines 265a, 265b in the draw directions 280, and separating the mold parts 270 along the parting lines 285a, 285b in the draw directions 275.

As illustrated in FIGS. 5A and 5B, the symmetrical mold assembly 200 includes two part lines 215a, 215b, whereas the asymmetrical mold assembly 250 includes four part lines 265a, 265b, 285a, 285b. In other embodiments, other mold release configurations may be used. That is, the aerator mixing rod 10 may be formed using mold assemblies having other numbers and/or configurations of mold parts to facilitate different constructions of the aerator mixing rod 10. As described in greater detail below, the mold assembly used to form the aerator mixing rod is configured to prevent undercuts that would inhibit releasing the mold parts (e.g., 210, 260, 270) from the aerator mixing rod 10 after molding.

Undercuts are any surfaces that cannot be seen when viewed from the pull direction of the mold part. If an undercut feature is molded, the mold part may catch on the undercut, which prevents the mold part from retracting after molding.

Figure 6A:
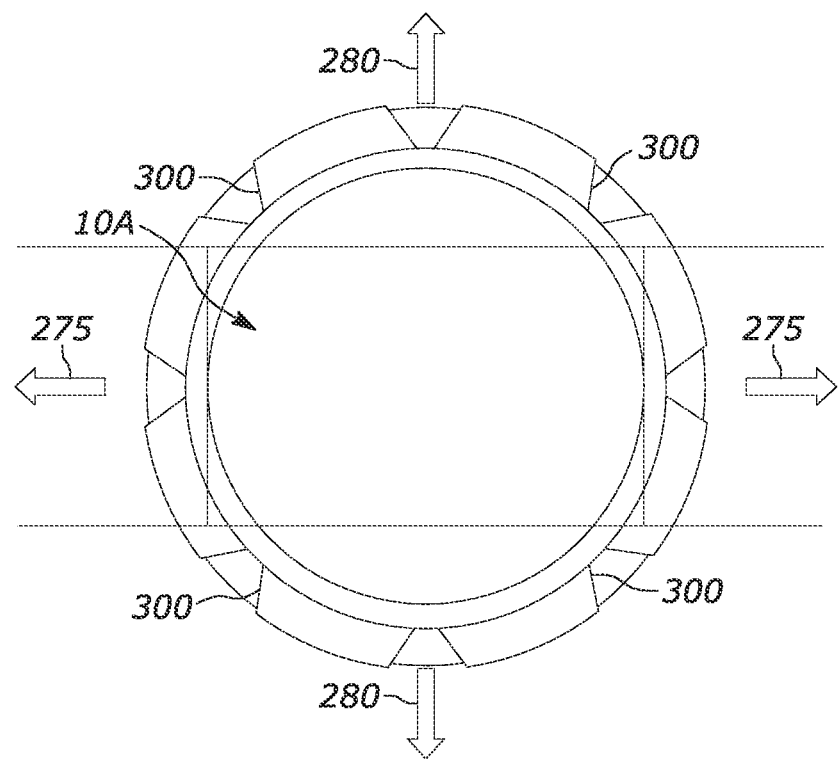
FIG. 6A is an end view of an aerator mixing rod illustrating an asymmetrical mold release configuration that results in an undercut.
Figure 6B:
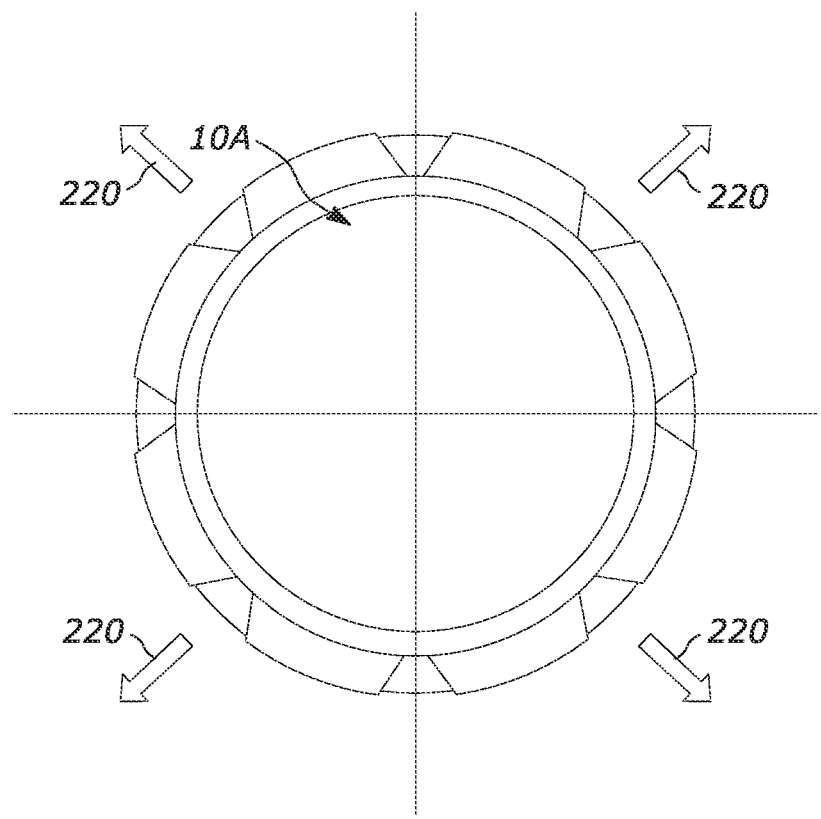
FIG. 6B is an end view of the aerator mixing rod of FIG. 6A illustrating a symmetrical mold release configuration that eliminates the undercut of FIG. 6A.

For example, FIG. 6A illustrates an example of an aerator mixing rod 10A, which cannot be molded using the asymmetrical mold assembly 250 of FIG. 5B without forming undercuts. More specifically, due to the geometry of the aerator mixing rod 10A illustrated in FIG. 6A, multiple undercuts 300 exist that would prevent the first mold parts (not shown) from retracting in the direction of the arrows 280. To avoid the undercuts 300, the same aerator mixing rod 10A can be molded using the symmetrical mold assembly 200 of FIG. 5A. That is, the aerator mixing rod 10A can be molded without any undercuts 300 by radially releasing the mold parts (not shown) in the direction of arrows 220.

The minimum number of mold parts to form an aerator mixing rod, such as the aerator mixing rod 10, may be proportional to the greatest number of teeth 20 in a respective row 22A, 22B. For example, in embodiments in which the rows 22A, 22B each have a maximum of four teeth 20, two mold parts arranged to separate from a single part line may be used to form the desired structure of the aerator mixing rod 10. In embodiments in which the rows 22A, 22B each have a maximum of six teeth 20, three mold parts may be used to form the desired structure of the aerator mixing rod 10, and in embodiments in which the rows 22A, 22B each have a maximum of eight teeth 20, four mold parts may be used to form the desired structure of the aerator mixing rod 10. As such, in some embodiments, the number of mold parts of the mold assembly may be equal to two times the maximum number of teeth 20 in any given row along the aerator mixing rod 10. Although each of the examples described herein includes an even number of teeth 20 in the respective rows 22A, 22B, in other embodiments, the aerator mixing rod 10 may be configured with an odd number of teeth 20 in one or both rows 22A, 22B.

Figures 7A, 7B:
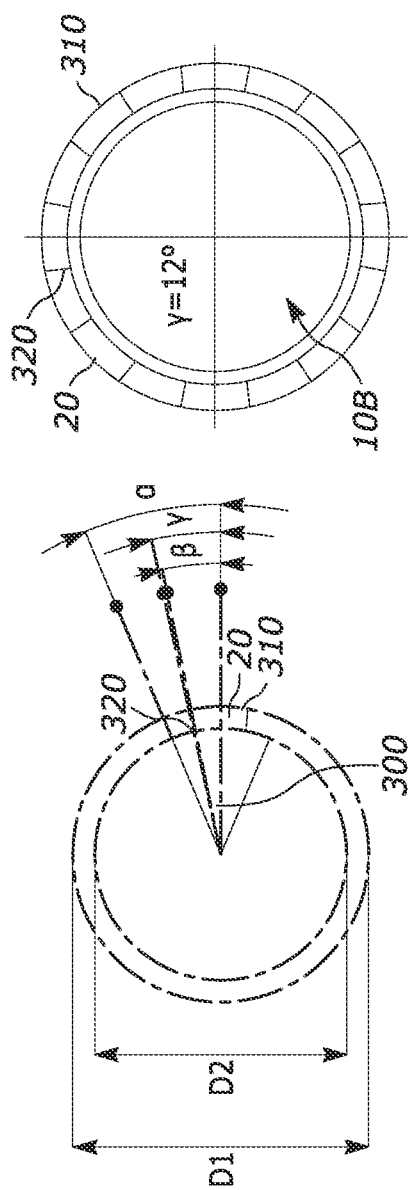
FIG. 7A is an end view of an aerator mixing rod having a first tooth geometry.
FIG. 7B is an end view of an aerator mixing rod having a second tooth geometry.

The aerator mixing rod 10 can be formed with teeth 20 of various geometries. For example, FIGS. 7A and 7B illustrate aerator mixing rods 10B and 10C having different tooth geometries. An outer profile 310 of the teeth 20 defines a first diameter D1 (i.e. tip-to-tip), and an inner profile or base 320 of the teeth 20 defines a second diameter (i.e. base-to-base) D2. Thus, the height of the teeth 20 may be expressed as a ratio of the first and second diameters D1:D2.

With continued reference to FIGS. 7A and 7B, the geometry of each tooth 20 may be further defined by a series of angles all measured with respect to a radial reference line or axis 300 that extends through the center of the tooth 20. FIGS. 7A and 7B illustrate a first angle, $\alpha$ (alpha), defined between the axis 300 and an inner side edge of an adjacent tooth 20, a second angle, $\gamma$ (gamma), defined between the axis 300 and an inner side edge of the tooth 20, and a third angle, $\beta$ (beta), defined between the axis 300 and an outer side edge of the tooth 20. Finally, referring to FIG. 3A, each tooth 20 defines a thickness T of in an axial direction (i.e. parallel to the axis 15 of the aerator mixing rod 10).

The thickness T and interstitial distance G (FIG. 3A), and the angles $\alpha$, $\gamma$, $\beta$ diameters D1, D2 (FIGS. 7A-7B), may be optimized for a desired mixing application or material. For example, varying the angle $\alpha$ varies the offset-distance between adjacent teeth 20 and thus the areas of the respective passageways 30, 32 between adjacent teeth 20. Additionally, varying the diameters D1, D2, and/or the angles $\alpha$, $\gamma$, $\beta$ allows an overlap between the rows of teeth 20, 22 to be optimized for a specific mixing material or application. For example, by increasing $\beta$, the width of each tooth at the outer profile 310 will increase, resulting in an increased amount of tooth overlap between the plurality of teeth 20 on the aerator mixing rod 10. A greater tooth overlap may provide a more tortuous path between the rows 22A, 22B of teeth 20, producing a greater mixing and/or aerating effect. The angle $\gamma$ may be increased to make the teeth 20 more v-shaped (e.g., FIG. 7B) or decreased to make the teeth 20 more rectangular (e.g., FIG. 7A).

In addition to determining tooth overlap to ensure proper mixing, the reference angles $\alpha$, $\gamma$, $\beta$ control the axial surface area of each tooth 20. The shear force acting on liquid product that flows along the aerator mixing rod 10 is dependent upon the surface areas of the teeth 20. A greater surface area of the teeth 20 may also increase the flow-resistance and the corresponding pressure drop across the aerator mixing rod 10.

Thus, the geometry of an aerator mixing rod is complex, and the dimensions and angles described above each play a role in the performance of an aerator mixing rod in a particular application. Through extensive testing and analysis, the following ranges and ratios have been discovered to provide optimum performance when using the aerator mixing rod 10 to produce a whipped cream product (including both dairy and non-dairy based cream).

More specifically, in some embodiments, the ratio D1:D2 may be between 10:1 and 20:19, such that D2 is between 10% of D1 and 95% of D1. In other embodiments, the ratio D1:D2 may be between 5:1 and 20:19, such that D2 is between 20% of D1 and 95% of D1. In yet other embodiments, the ratio D1:D2 may be between 3:1 and 10:9, such that D2 is between 33% of D1 and 90% of D1. In embodiments in which the aerator mixing rod 10 is used for whipping cream, it has been found that a ratio of D1:D2 between 14:10 and 14:13, such that D2 is between about 71% and about 93% of D1 may be particularly advantageous.

In some embodiments, the thickness T of each tooth 20 may be equal to the interstitial distance G between the rows 22A, 22B of teeth 20. In other embodiments, the ratio of the thickness T of each tooth 20 the interstitial distance G can be between 0.5:1 and 1:2. In other words, the interstitial distance G can be between half the thickness T to twice the thickness T of each tooth 20. It has been found that this range of ratios of the thickness T to the interstitial distance G may be particularly advantageous for whipping cream.

In some embodiments, the angle $\gamma$ is greater than or equal to 12°. For example, the angle $\gamma$ can be 12°, 16°, 20°, 22.5, or other angles. The angle $\beta$ can be any angle between 0° and 20° in some embodiments. For example, the angle $\beta$ can be 5°, 11.25°, 15°, or other angles. In some embodiments, the angle $\beta$ can be any angle between 0° and 11.25°. It has been found that these values and ranges for the angles $\gamma$ and $\beta$ may be particularly advantageous for whipping cream.

Importantly, in addition to affecting the aeration/texture of the final whipped product, the angles $\alpha$, $\gamma$, $\beta$ also affect whether the aerator mixing rod 10 is injection moldable. First, referring to FIG. 7B, the angle $\gamma$ must be greater than the angle $\beta$ such that the inner width of the tooth 20 is wider than the outer width. In other words, the teeth 20 are tapered in a radial direction. This allows undercuts to be avoided. In some embodiments, the angle $\gamma$ is at least 0.5° greater than the angle $\beta$. In some embodiments, the angle $\gamma$ is at least 2° greater than the angle $\beta$. In some embodiments, the angle $\gamma$ is at least 5% greater than the angle $\beta$. In some embodiments, the angle $\gamma$ is at least 10% greater than the angle $\beta$.

Figure 9A:
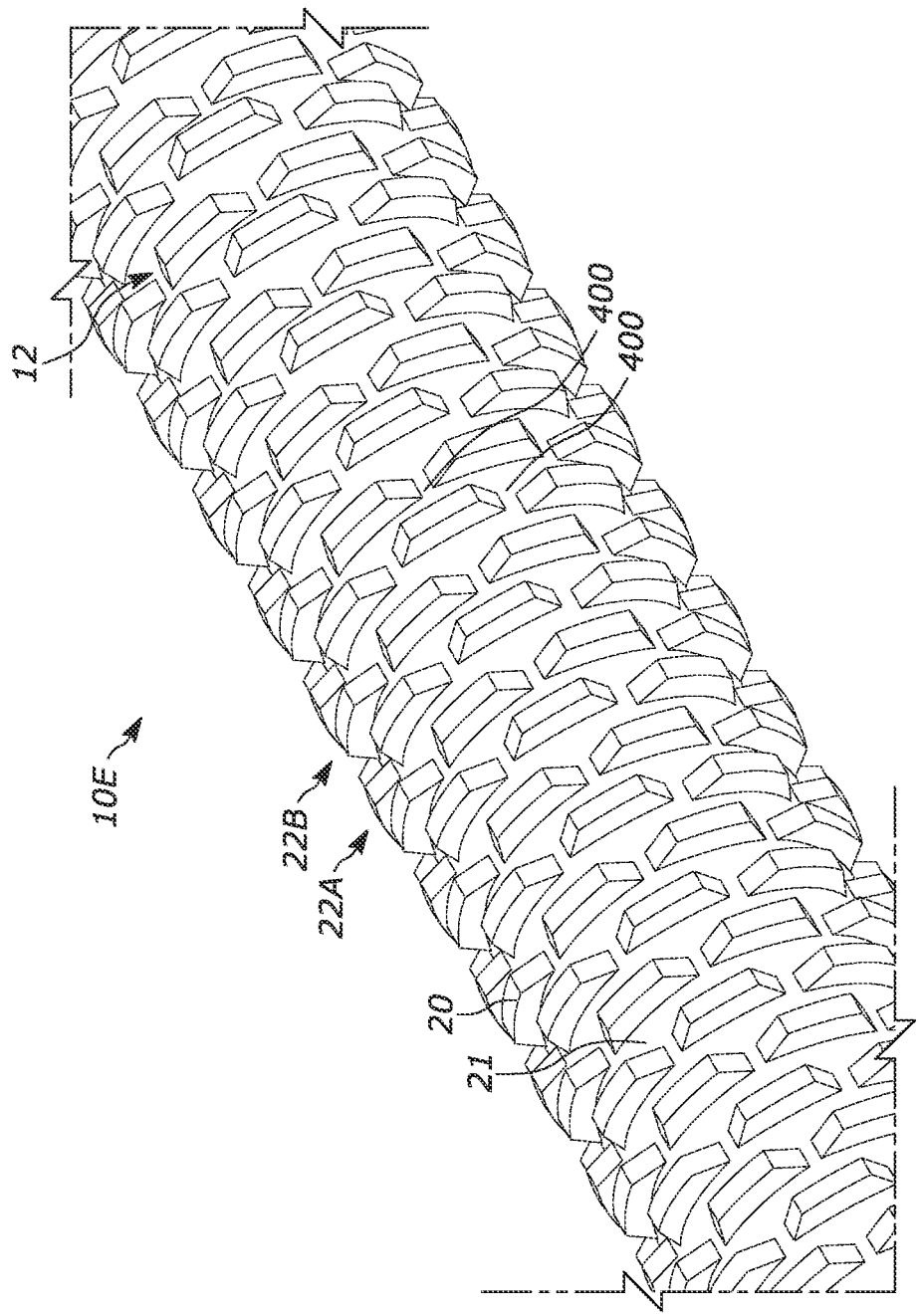
FIG. 9A is a perspective view illustrating a portion of an aerator mixing rod according to another embodiment.
Figure 9B:
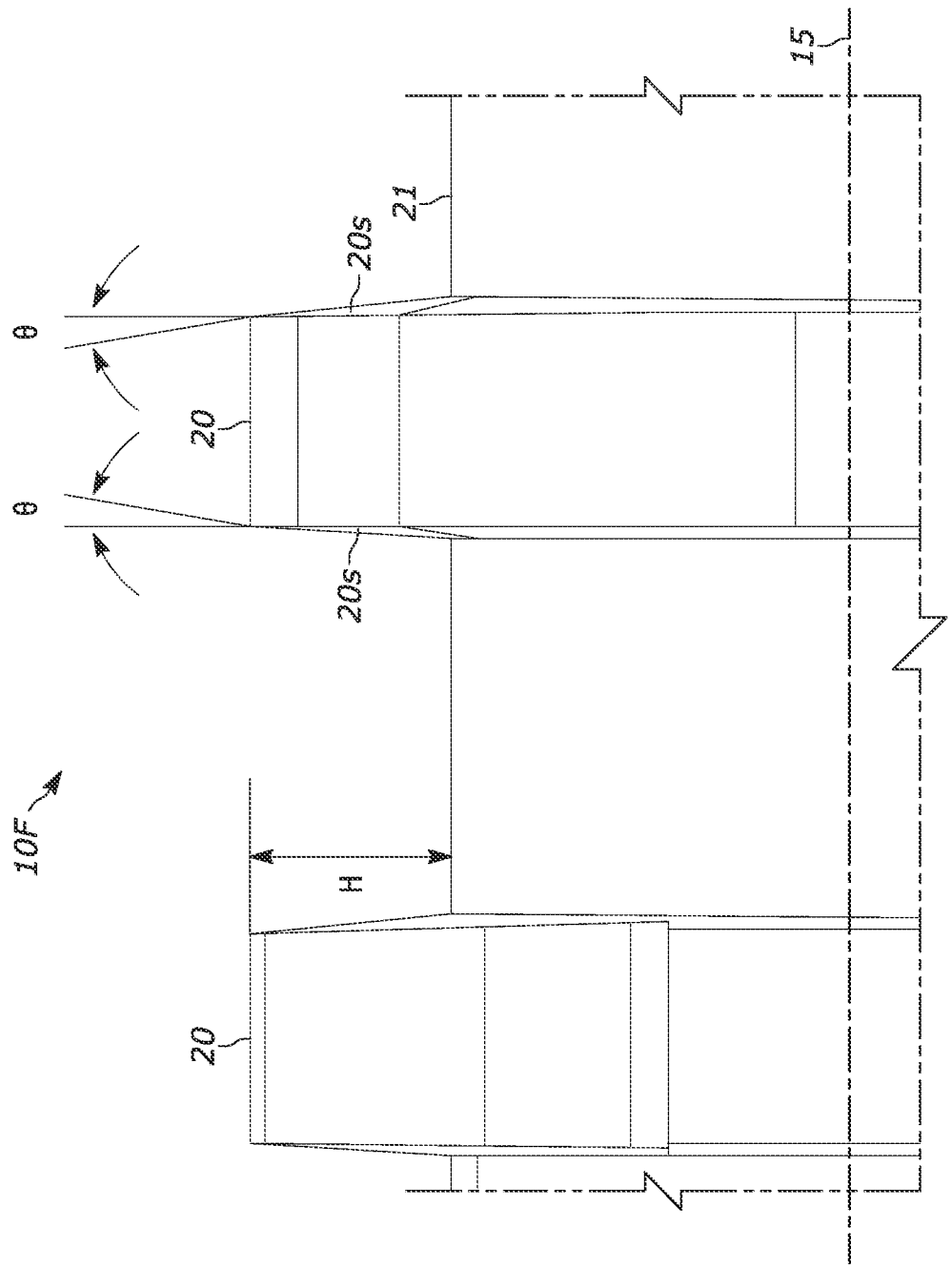
FIG. 9B is an enlarged side view illustrating a portion of an aerator mixing rod according to another embodiment.

In some embodiments, the teeth 20 of the aerator mixing rod 10 may include draft angles to make the aerator mixing rod 10 more easily removable from the mold assembly. For example, FIG. 9B illustrates an aerator mixing rod 10F in which the axial faces of each tooth 20 define draft angles θ relative to an axis transverse to the longitudinal axis 15 of the aerator mixing rod 10F. In the illustrated embodiment, the draft angles θ are each greater than 0° (e.g. 1° or more) to facilitate the release of the mixing rod 10 from the mold assembly. In some embodiments, the draft angles θ on each axial side 20s of the teeth 20 may be the same or different.

Typically, parts manufactured using CNC machining have a draft angle θ of zero degrees, because CNC machining utilizes a cutting tool to shape the specific features of the part, rather than a molten plastic (or other injection moldable material) being injected into a mold, which must then be released and removed from the mold. When a part is being removed from a mold, a friction force exists between the mold and the part that can tear or deform the part. With the addition of a draft angle θ, the friction force is reduced due to the tapered "v" shape of the part. In some embodiments, the draft angle θ can be proportional to the tooth height H (FIG. 9B). For example, the larger the tooth height H of the plurality of teeth 20, the larger the draft angle θ.

Figure 8:
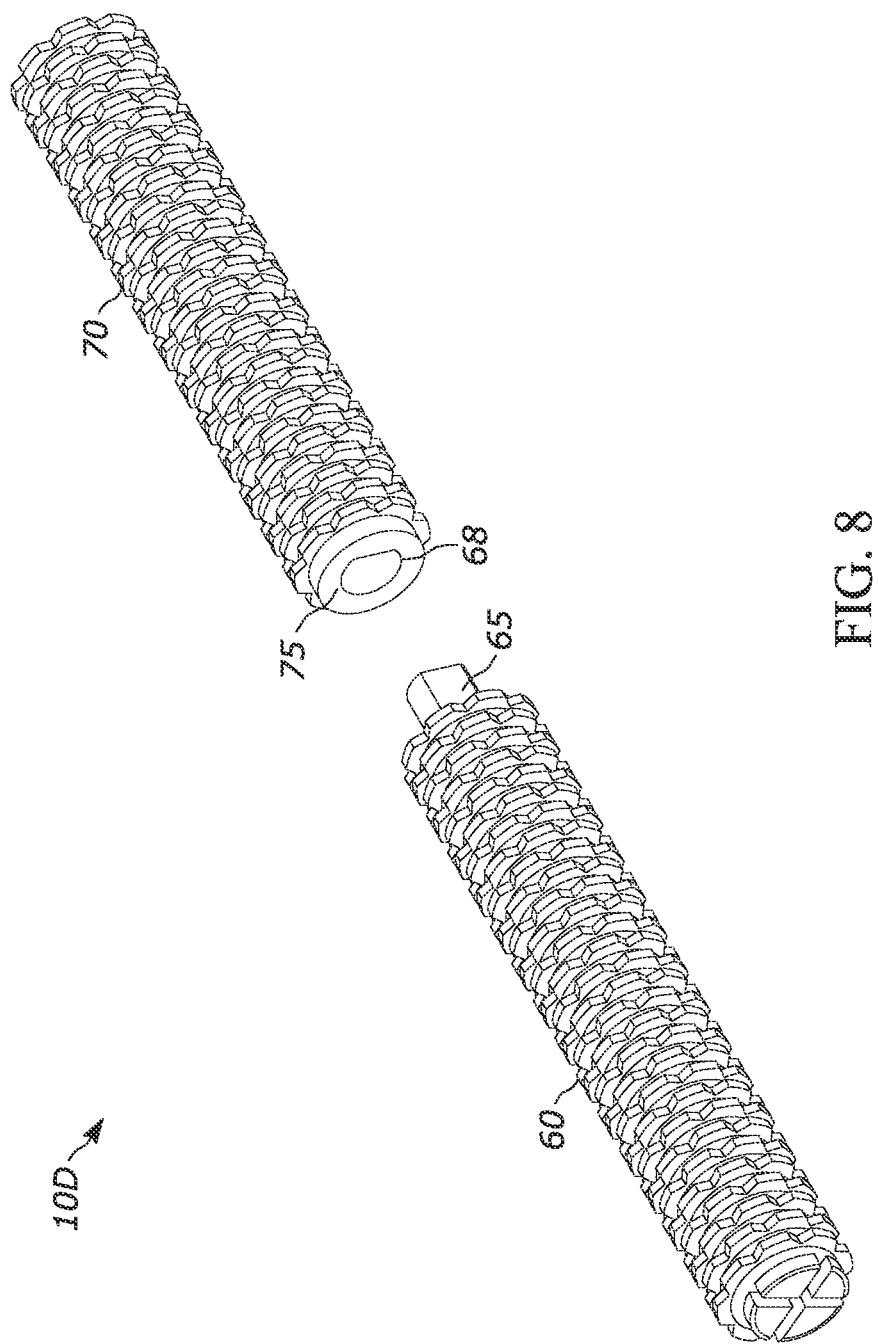
FIG. 8 is a perspective view of an aerator mixing rod according to another embodiment.

With reference to FIG. 8, in some embodiments, the aerator mixing rod 10 can be formed from a plurality of longitudinal segments. For example, FIG. 8 illustrates an aerator mixing rod 10D split into a first portion 60 and a second portion 70 configured to be joined together to form the full length of the aerator mixing rod 10D. Because each portion 60, 70 is only half of the length of the aerator mixing rod 10D, separately molding the first portion 60 and the second portion 70 may produce less tolerance stack-up and therefore result in greater dimensional accuracy and/or lower precision requirements for the mold assembly. In some embodiments, the first portion 60 and the second portion 70 may include cooperating attachment features 65, 68 (e.g., a projection 65 on the first portion 60 and a corresponding recess 68 on the second portion 70, or vise versa) to facilitate coupling the first portion 60 to the second portion 70. In other embodiments, the first portion 60 and the second portion 70 can be separately injection moldable parts arranged side-by-side, rather than being joined in an axial direction.

In some embodiments, the aerator mixing rod 10 may include relief gaps between adjacent teeth. For example, FIG. 9A illustrates an aerator mixing rod 10E including a relief gap 400 between adjacent teeth 20 in the circumferential direction. In other words, the teeth 20 in each row 22A, 22B are not continuously connected. Rather, a portion of the outer surface 21 of the main body 12 of the aerator mixing rod 10E extends between adjacent teeth 20. In other embodiments, a diameter of the relief gap 400 measured from the center of the aerator mixing rod 10 and the diameter of the outer surface 21 of the aerator mixing rod 10 can form a ratio between the ranges of 1:1-12:9. That is, in some embodiments, adjacent teeth in the circumferential direction may be interconnected by a raised wall (not shown) extending across the relief gap 400.

In some embodiment, the teeth 20 of the aerator mixing rod 10 may have a varying height. For example, FIG. 9C illustrates an aerator mixing rod 10G with teeth 20 configured such that an outer surface 800 of each tooth 20 is angled with respect to the longitudinal axis 15 of the aerator mixing rod 10G. The teeth 20 thus form a raised edge 810, which defines the maximum height H of the tooth. The angled surfaces 800 may produce greater turbulence in the liquid product as the product flows past the teeth 20, which may advantageously enhance mixing for certain products. In some embodiments, the angled surface 800 may be oriented at an angle between 1 degree and 45 degrees relative to the longitudinal axis 15. In other embodiments, the angled surface 800 may be oriented at an angle between 5 degrees and 30 degrees relative to the longitudinal axis 15.

Figure 10:
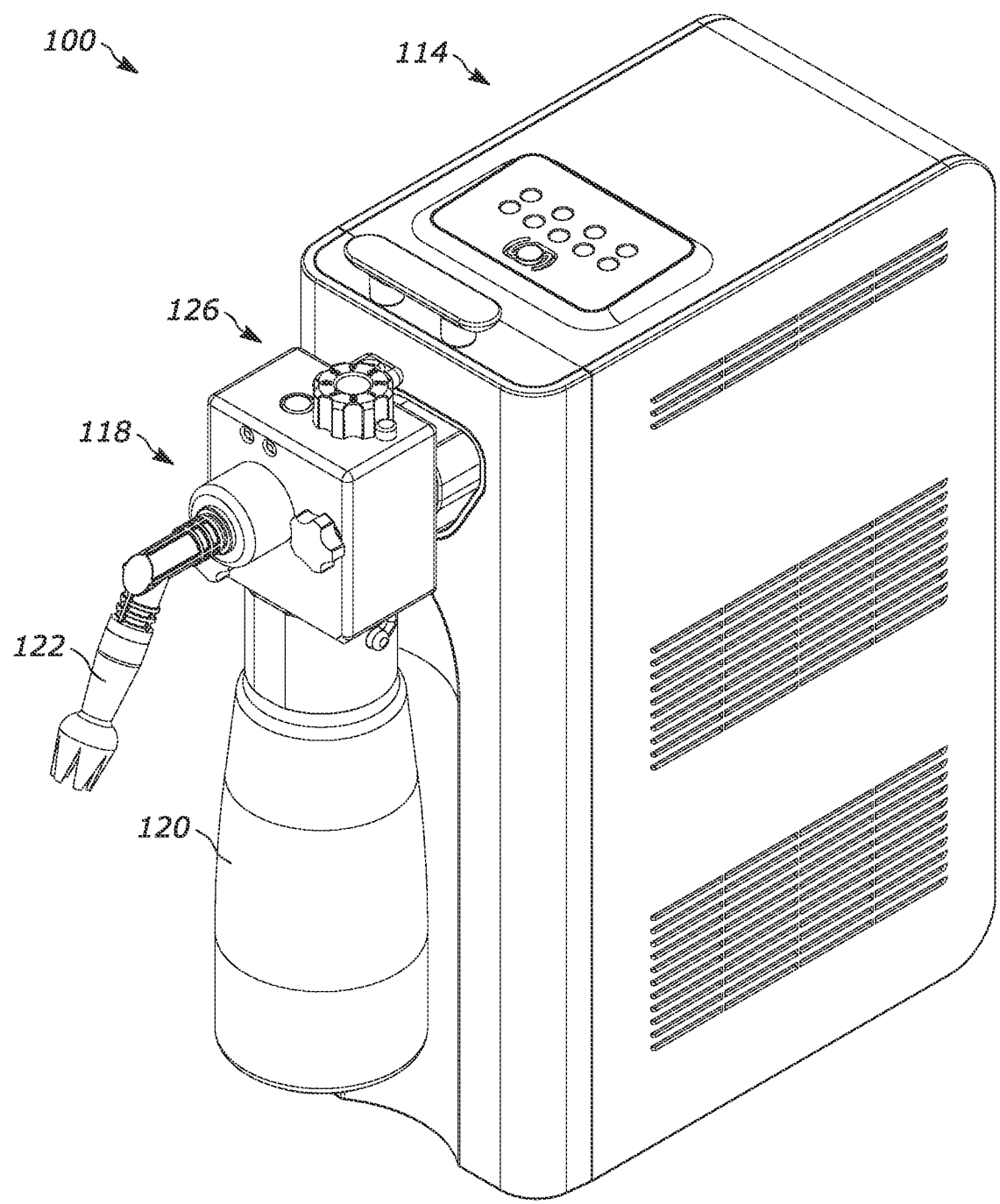
FIG. 10 is a perspective view of a food product dispenser incorporating an aerator mixing rod.

FIG. 10 illustrates a food product dispenser 100. The food product dispenser 100 may be configured to utilize an injection moldable aerator mixing rod, such as the aerator mixing rod 10. The illustrated food product dispenser 100 includes a drive unit 114 and a dispensing unit or module 118 removably coupled to the drive unit 114. The dispensing unit 118 includes a product reservoir 120 containing the liquid product to be whipped, a dispensing nozzle 122, and a product transfer assembly or whipping assembly 126 configured to be powered by the drive unit 114 to move product from the reservoir 120 to the dispensing nozzle 122.

Figure 11:
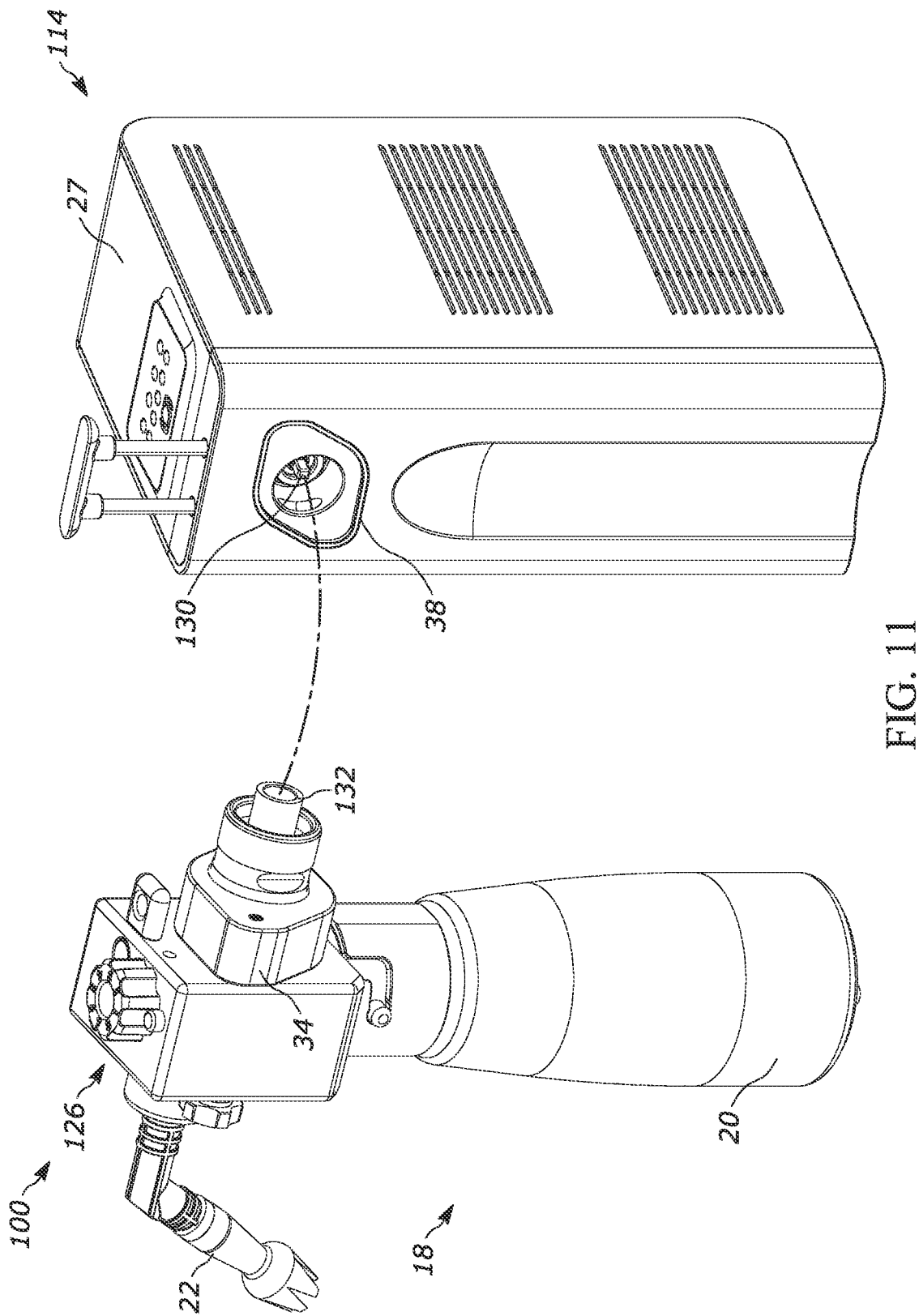
FIG. 11 is a perspective view of the food product dispenser of FIG. 10, illustrating a dispensing unit separated from a drive unit of the food product dispenser.

Referring to FIG. 11, the illustrated drive unit 114 includes a drive shaft 130 configured to engage a drive socket 132 on the whipping assembly 126 when the dispensing unit 118 is coupled to the drive unit 114. The drive shaft 130 is driven by a motor (not shown) housed within the drive unit 114 to provide a rotational input to the whipping assembly 126.

The whipping assembly 126 includes an aerator in fluid communication with the product reservoir 120 and a pump assembly 146 (e.g., a gear pump, wiper pump, or the like) driven by the motor (via the drive shaft 130 and drive socket 132) for drawing the product from the product reservoir 120 and forcing the product through the aerator to form an aerated or "whipped" product. The aerator communicates with the dispensing nozzle 122, which is configured to dispense the whipped product.

In some embodiments, the dispensing unit 118 may include the motor. In such embodiments, the drive shaft 130 and drive socket 132 may be replaced by electrical connectors. In other embodiments, the drive unit 114 may include a source of pressurized gas, such as a refillable and/or interchangeable pressurized gas canister, and/or a compressor operable to generate pressurized gas on demand. In such embodiments, the drive shaft 130 and drive socket 132 may be replaced by a pneumatic connector, and preferably a quick-release pneumatic connector such as a bayonet fitting. The drive unit 114 may then supply the pressurized gas to the dispensing unit 118 to force the liquid product from the product reservoir 120 through the aerator (e.g., by pressurizing the product reservoir 120). Alternatively, the pump may include a rotary vane, and the pressurized gas may drive the rotary vane to operate the pump. In yet other embodiments, the pressurized gas may be directed through a venturi, creating suction to draw liquid product from the product reservoir. The liquid product may then be entrained in the flow of pressurized gas and directed through the aerator.

With reference to FIG. 11, the dispensing unit 118—which includes the product reservoir 120, whipping assembly 126, and dispensing nozzle 122—can be quickly removed from the drive unit 114 as a single, self-contained assembly. This allows a user to remove the dispensing unit 118 when not in use and store it in a refrigerator. The product and all of the downstream components that contact the product can therefore be maintained at safe temperatures without requiring a dedicated refrigeration system. This advantageously reduces the size, cost, complexity, energy requirements, and operating noise of the dispenser 100 as compared to existing dispensers with on-board refrigeration systems.

The product reservoir 120 of the dispensing unit 118 is preferably insulated in order to keep the product contained therein at a suitably cold temperature for a long period of time when the dispensing unit is outside of the refrigerator. For example, the product reservoir 120 may be a double-walled, vacuum-insulated canister. The product reservoir 120 may be made of stainless steel, or any other insulating, food-safe material, including but not limited to a plastic material. In some embodiments, the product reservoir 120 may include a thermally-conductive area in contact with an inner wall of the product reservoir 120 to enhance cooling of the product within the reservoir 120 when the dispensing unit 118 is placed in the refrigerator. In such embodiments, an insulating cover may be provided to cover the thermally-conductive area when the product reservoir 120 is removed from the refrigerator for use. In some embodiments, the thermally conductive area may be cooled by ice or a cooling apparatus (such as a thermoelectric cooler) while the dispensing unit 118 is coupled to the drive unit 114.

In some embodiments, the product reservoir 120 may be a disposable product package, such as an aseptic brick package, a plastic or metal foil pouch, or a bag-in-box assembly. Disposable product packaging may facilitate interchanging the type of product to be dispensed by the dispensing unit 118 without having to clean the product reservoir 120. In any such embodiments, the product reservoir 120 may optionally be insertable into an insulating sleeve or casing.

Figure 12:
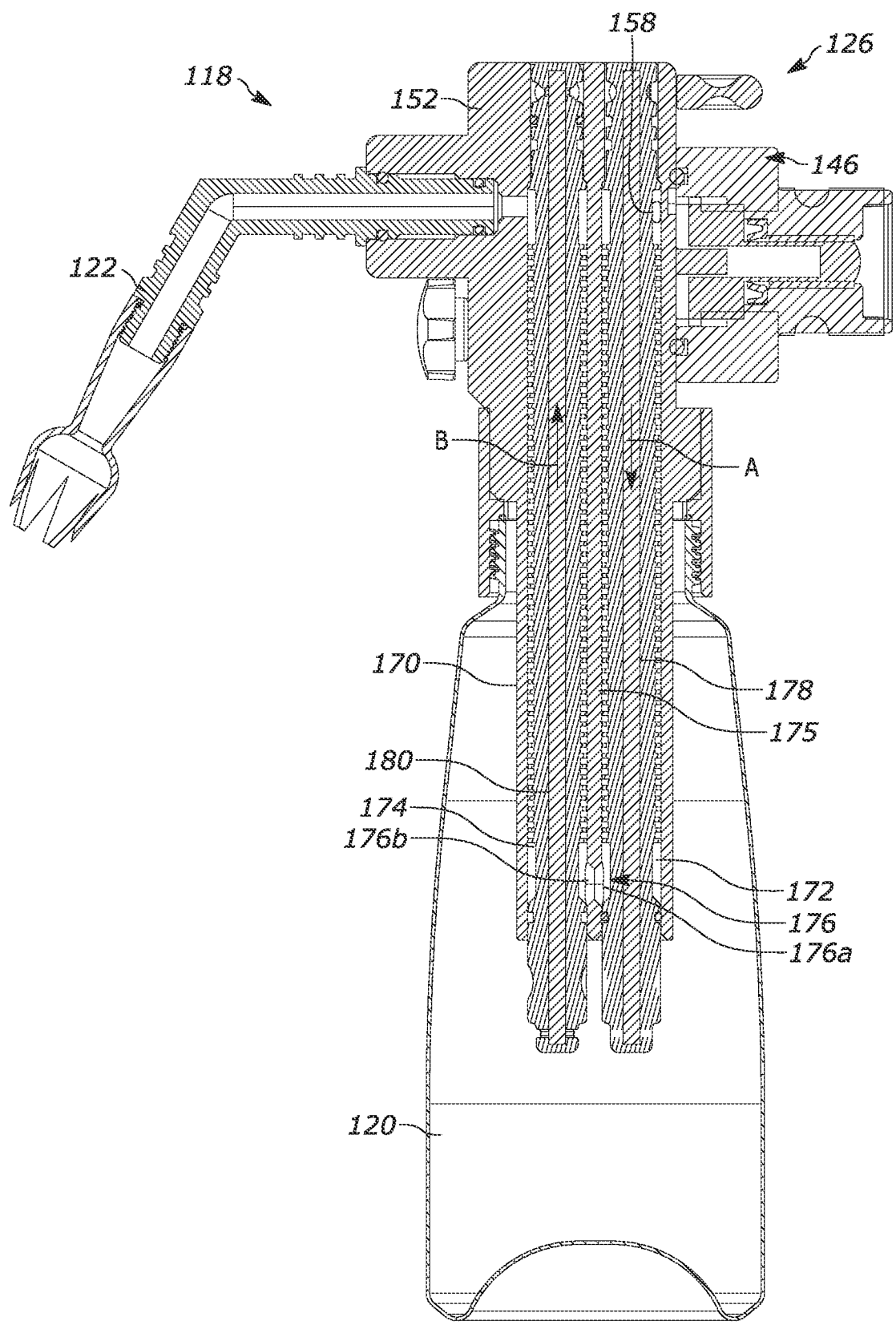
FIG. 12 is a cross-sectional view of the dispensing unit of FIG. 11, illustrating a product flow path through the dispensing unit.

With reference to FIG. 12, the whipping assembly 126 includes a housing 152 removably coupled to the product reservoir 20, with an aerator housing portion 170 extending into the product reservoir 120. The aerator housing portion 170 includes a first chamber 172 and a second chamber 174 separated by a longitudinally-extending dividing wall 175. The second chamber 174 is in fluid communication with the first chamber 172 via a transfer passage 176 extending through the dividing wall 175.

In the illustrated embodiment, the transfer passage 176 includes a first rounded bore 176*a* and a second rounded bore 176*b* intersecting the first rounded bore 176*a*. The rounded bores 176*a*, 176*b* may have generally spherical profiles. In some embodiments, the first rounded bore 176*a* is formed by inserting a ball end mill through a bottom end of the aerator housing portion 170 and into the first chamber 172 until the ball end mill engages and removes material from the dividing wall 175. Likewise, the second rounded bore 176*b* is formed by inserting the ball end mill through the bottom end of the aerator housing and into the second chamber 174 until the ball end mill engages and removes material from the dividing wall 175 opposite the first rounded bore 176*a*. Machining the transfer passage 176 in this manner advantageously allows for the transfer passage 176 to be formed without requiring any additional access openings, which would be required to drill transversely through the dividing wall 175 using a straight drill bit, for example. In addition, the rounded bores 176*a*, 176*b* lack sharp corners and 90-degree interface angles, which inhibits product from becoming lodged in the transfer passage 176 and thereby facilitates cleaning. In some embodiments, the transfer passage 176 (including the rounded bores 176*a*, 176*b*) may be formed in other ways, including but not limited to injection-molding or 3D printing.

With continued reference to FIG. 12, a first mixing rod 178 is supported within the first chamber 172, and a second mixing rod 180 is supported within the second chamber 174. In the illustrated embodiment, the first and second mixing rods 178, 180 are stationary labyrinth mixing rods, such as the aerator mixing rod 10 described above. As such, the mixing rods 178, 180, have teeth 20 and passageways 30, 32 (FIGS. 3A-3B) to define a tortuous flow pathway along the exterior of the mixing rods 178, 180. In other embodiments, one or more mixing rods of other types or geometries may be used. In the illustrated embodiment, each of the mixing rods 178, 180 is made of plastic; however, the mixing rods 178, 180 may be made from other materials in other embodiments.

In use, the drive unit 114 drives the pump assembly 146, which forces an air and product mixture into the first chamber 172 of the aerator housing portion 170. The air and product mixture then flows along the first mixing rod 178 in a first direction (i.e. the direction of arrow A as shown in FIG. 12), which partially aerates the product. Upon reaching the end of the first mixing rod 178, the partially aerated product flows through the transfer passage 176 in a second direction. In the illustrated embodiment, the second direction is generally transverse to the first direction. The partially aerated product then flows in a third direction (i.e. in the direction of arrow B), which is generally opposite the first direction, and over the second mixing rod 180. This completes aeration of the product, and the aerated or whipped product is discharged from the second chamber 174 through the dispensing nozzle 122.

By providing two mixing rods 178, 180 in separate sections, the overall height of the assembly is reduced, which in turn allows the overall size of the dispensing unit 118 to be minimized. In addition, the manufacturing tolerances for the mixing rods 178, 180 may be reduced, since the relatively shorter length of each rod 178, 180 (compared to a single-piece rod having a length equal to the combined lengths of the rods 178, 180) produces less tolerance stack-up. In other embodiments, however, other mixing rod configurations may be used, including a single-piece mixing rod, or any other number of mixing rods.

During operation, shearing of the product mixture that takes place as the product mixture flows over the mixing rods 178, 180 produces heat. Because the mixing rods 178, 180 are made of a material with low thermal conductivity (e.g., plastic in the illustrated embodiment), a minimal amount of heat is absorbed by the mixing rods 178, 180. Rather, the generated heat is carried away with the product. In the illustrated embodiment, the mixing rods 178, 180 have a thermal conductivity between 0.1 and 0.5 Watts/Meter-Kelvin. In contrast, a conventional mixing rod, which is typically made of metal such as stainless steel, may have a thermal conductivity between 10 and 20 Watts/Meter-Kelvin or more. Thus, a conventional mixing rod may have a thermal conductivity at least 50 to 100 times greater than the mixing rods 178, 180, resulting in more heat being absorbed by the mixing rod. The low thermal conductivity of the mixing rods 178, 180 in the illustrated embodiment is particularly advantageous when the housing portion 170 is submerged within product contained within the product reservoir 120, such that heating of the product within the product reservoir 120 is minimized.

Figure 13:
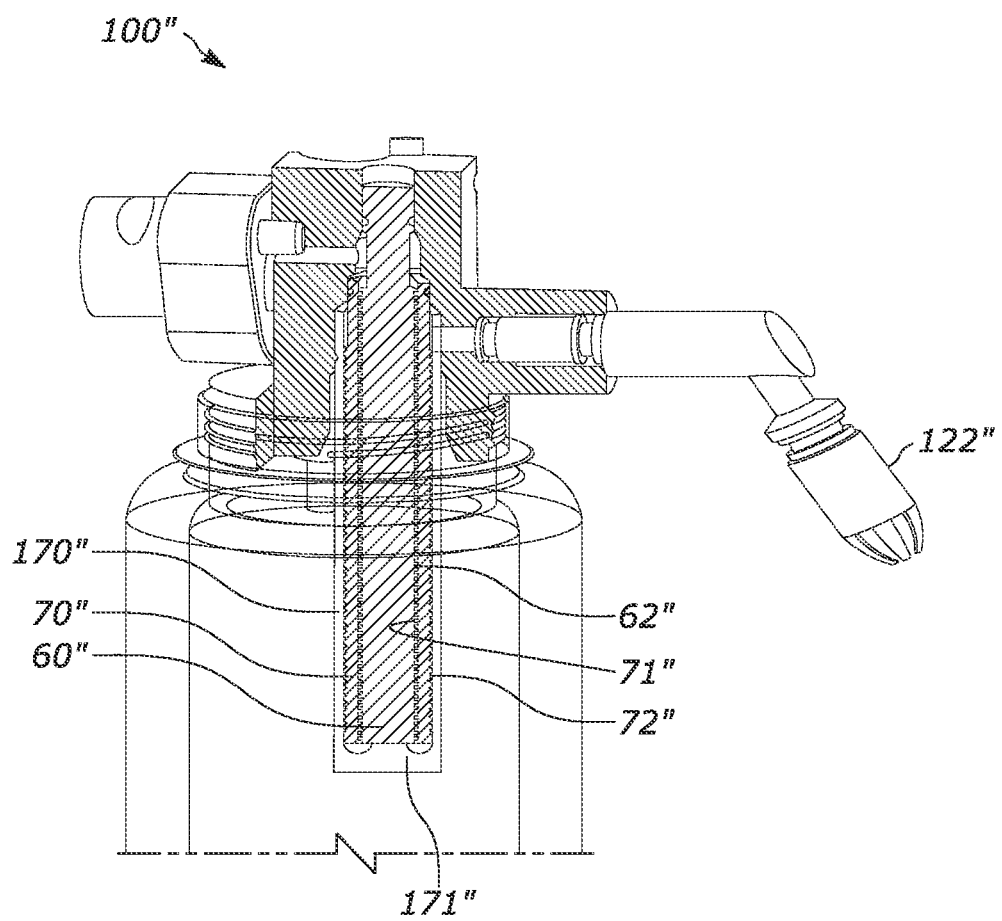
FIG. 13 is a cross-sectional view illustrating a portion of a dispensing unit according to another embodiment and incorporating an aerator mixing rod.

FIG. 13 illustrates a dispenser 100" according to another embodiment. The dispenser 100" is similar to the dispenser 100 described above with reference to FIGS. 10-12 but includes an aerator mixing rod 10" received within a housing 170" and having a nested configuration. In particular, the aerator mixing rod 10" includes a first portion 60" and a second portion 70" surrounding and arranged concentrically with the first portion 60". The second portion 70" includes a plurality of teeth (such as the teeth 20) located on both an interior side 71" and an exterior side 72" of the second portion 70". In some embodiments, the teeth on the exterior side 72" of the second portion 70" may alternatively be located on an inner wall of the housing 170". In some embodiments, the teeth on the interior side 71" of the second portion 70" may alternatively be located on an exterior side 62" of the first portion 60".

In operation, liquid product is forced through a tortuous pathway defined between the first portion 60" and the second portion 70". Upon reaching a bottom end 171" of the housing 170", the partially-whipped product is redirected outside of the second portion 70". The product then flows in the opposite direction, through the tortuous pathway between the exterior side 72" of the second portion 70" and the inner wall of the housing 170". This completes aeration of the product, and the aerated or whipped product is then discharged through a dispensing nozzle 122".

The aerator mixing rods described and illustrated herein can be used to produce different product mixtures, such as air and water, oil and air, solutes and solvents, etc. It should be understood that, in addition to food product dispensers, an injection-molded aerator mixing rod may advantageously be used in a wide variety of applications. Finally, although the aerator mixing rods described and illustrated herein are preferably made by injection molding, in other embodiments, the aerator mixing rods may be manufactured by other methods, including but not limited to 3D printing or other additive manufacturing processes. Manufacturing aerator mixing rods using such alternative methods may suitable for small volume productions.

Although the disclosure has been described in detail with reference to certain preferred embodiments, variations and modifications exist within the scope and spirit of one or more independent aspects of the disclosure as described.

Various features and aspects of the disclosure are set forth in the following claims.

What is claimed is:

1. A method of manufacturing an aerator mixing rod using injection molding, the method comprising:
    arranging a plurality of mold parts into a mold assembly structure, the mold assembly structure defining a mold cavity shaped to form the aerator mixing rod, such that the aerator mixing rod includes
        a body having a first end, a second end opposite the first end, and an outer surface extending between the first and second ends, the body defining a longitudinal axis extending through the first and second ends, and
        a plurality of teeth extending radially outward from the outer surface of the body. the plurality of teeth including a first row of teeth and a second row of teeth spaced from the first row of teeth along the longitudinal axis, wherein a first passageway is formed between adjacent teeth of the first row of teeth, and a second passageway is formed between adjacent teeth of the second row of teeth, wherein the first passageway is at least partially misaligned with the second passageway in a direction parallel to the longitudinal axis such that the first passageway and the second passageway are configured to at least partially form a tortuous path for fluid flowing along the outer surface of the body;
    heating an injection moldable material;
    injecting the injection moldable material into the mold assembly structure to form the aerator mixing rod; and
    after a cooling period, removing the aerator mixing rod from the mold assembly structure by separating the plurality of mold parts from the aerator mixing rod,
    wherein arranging the plurality of mold parts into the mold assembly structure includes selecting between a plurality of different mold release configurations in order to prevent an undercut,
    wherein at least one of the mold release configurations is a symmetrical configuration including a plurality of part lines intersecting at a center of the mold cavity, and
    wherein separating the plurality of mold parts includes separating the mold parts along the part lines.

2. The method of claim 1,
    wherein each tooth of the plurality of teeth includes a first side and a second side generally opposite the first side, and wherein the first and second sides converge in a radial outward direction of the aerator mixing rod.

3. The method of claim 2, wherein the first and second sides are axially-facing sides.

4. The method of claim 2, wherein the first and second sides are circumferentially facing sides.

5. The method of claim 2, wherein each tooth of the plurality of teeth includes an inner width and an outer width, the inner width defined adjacent the outer surface of the body, and wherein the inner width is greater than the outer width.

6. The method of claim 5, wherein the inner width is at least 5% greater than the outer width.

7. The method of claim 2, wherein each tooth of the plurality of teeth includes an outermost point, wherein the outermost points of the plurality of teeth collectively define a first diameter, wherein the body defines a second diameter, and wherein the second diameter is between 10% and 95% of the first diameter.

8. The method of claim 2, wherein the injection-moldable material is a plastic material.

9. The method of claim 8, wherein the plastic material includes an acetal homopolymer.

10. The method of claim 2, wherein the first row of teeth and the second row of teeth each include 8 teeth.

11. The method of claim 2, wherein the aerator mixing rod includes a core and an outer shell, wherein the outer shell is molded over the core, and wherein the outer shell includes the plurality of teeth.

12. The method of claim 1, wherein the aerator mixing rod includes a thermal conductivity between 0.1 and 0.5 Watts/Meter-Kelvin.

13. A method of manufacturing an aerator mixing rod using injection molding, the method comprising:
    arranging a plurality of mold parts into a mold assembly structure, the mold assembly structure defining a mold cavity shaped to form the aerator mixing rod, such that the aerator mixing rod includes
        a body having a first end, a second end opposite the first end, and an outer surface extending between the first and second ends, the body defining a longitudinal axis extending through the first and second ends, and
        a plurality of teeth extending radially outward from the outer surface of the body, the plurality of teeth including a first row of teeth and a second row of teeth spaced from the first row of teeth along the longitudinal axis, wherein a first passageway is formed between adjacent teeth of the first row of teeth, and a second passageway is formed between adjacent teeth of the second row of teeth, wherein the first passageway is at least partially misaligned with the second passageway in a direction parallel to the longitudinal axis such that the first passageway and the second passageway are configured to at least partially form a tortuous path for fluid flowing along the outer surface of the body;
    heating an injection moldable material;

injecting the injection moldable material into the mold assembly structure to form the aerator mixing rod; and after a cooling period, removing the aerator mixing rod from the mold assembly structure by separating the plurality of mold parts from the aerator mixing rod, wherein arranging the plurality of mold parts into the mold assembly structure includes selecting between a plurality of different mold release configurations in order to prevent an undercut, wherein at least one of the mold release configurations is an asymmetrical configuration including four part lines, and wherein separating the plurality of mold parts includes separating the mold parts along the part lines.

14. The method of claim 13, wherein the injection-moldable material is a plastic material.

15. The method of claim 14, wherein the injection-moldable material includes an acetal homopolymer.

* * * * *